US012314091B2

(12) United States Patent
Cheng et al.

(10) Patent No.: US 12,314,091 B2
(45) Date of Patent: May 27, 2025

(54) FOLDING MECHANISM AND ELECTRONIC DEVICE

(71) Applicant: VIVO MOBILE COMMUNICATION CO., LTD., Guangdong (CN)

(72) Inventors: Dongcun Cheng, Guangdong (CN); Fei Dong, Guangdong (CN); Zhengjun Luo, Guangdong (CN); Zongwen He, Guangdong (CN); Ximing Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 125 days.

(21) Appl. No.: 18/446,932

(22) Filed: Aug. 9, 2023

(65) Prior Publication Data

US 2023/0384839 A1 Nov. 30, 2023

Related U.S. Application Data

(63) Continuation of application No. PCT/CN2022/075344, filed on Feb. 7, 2022.

(30) Foreign Application Priority Data

Feb. 10, 2021 (CN) .......................... 202110185542.0

(51) Int. Cl.
*G06F 1/16* (2006.01)
(52) U.S. Cl.
CPC ................................ *G06F 1/1681* (2013.01)

(58) Field of Classification Search
CPC ..... G06F 1/1681; G06F 1/1652; E05D 3/122; H04M 1/022; H04M 1/068; H04M 1/0268
See application file for complete search history.

(56) References Cited

U.S. PATENT DOCUMENTS

| 10,754,395 | B2 * | 8/2020 | Sanchez | H05K 5/0086 |
| 11,231,752 | B2 * | 1/2022 | Liu | H04M 1/0216 |
| 11,408,214 | B1 * | 8/2022 | Hsu | H04M 1/022 |
| 11,467,633 | B2 * | 10/2022 | Liao | F16C 11/04 |
| 11,720,152 | B2 * | 8/2023 | Hsu | G06F 1/1681 |
| | | | | 16/354 |

(Continued)

FOREIGN PATENT DOCUMENTS

| CN | 208734715 U | * | 4/2019 | |
| CN | 211174974 U | * | 8/2020 | ............ F16C 11/045 |

(Continued)

*Primary Examiner* — Jason W San
*Assistant Examiner* — Matthew J Sullivan
(74) *Attorney, Agent, or Firm* — BROOKS KUSHMAN P.C.

(57) ABSTRACT

A folding mechanism, where a first housing seat is provided on a first screen supporting plate, and the first screen supporting plate is rotatably fitted with the first housing seat; a second housing seat is provided on a second screen supporting plate, and the second screen supporting plate is rotatably fitted with the second housing seat; the first housing seat and the first screen supporting plate are arranged on a first side of a base, and the second housing seat and the second screen supporting plate are arranged on a second side of the base, the first side and the second side being arranged facing away from each other.

20 Claims, 10 Drawing Sheets

(56) References Cited

U.S. PATENT DOCUMENTS

| | | | | |
|---|---|---|---|---|
| 11,720,153 B2 * | 8/2023 | Hsu | ................ | G06F 1/1681 |
| | | | | 16/250 |
| 11,726,530 B2 * | 8/2023 | Kang | ................ | G06F 1/1681 |
| | | | | 361/679.27 |
| 11,832,405 B2 * | 11/2023 | Zhang | ................ | F16C 11/04 |
| 11,846,998 B2 * | 12/2023 | Wu | ................ | H05K 5/0226 |
| 11,856,721 B2 * | 12/2023 | Cheng | ................ | H04M 1/0268 |
| 11,885,164 B2 * | 1/2024 | Yang | ................ | G06F 1/1681 |
| 11,914,433 B2 * | 2/2024 | Liao | ................ | G06F 1/1652 |
| 11,920,395 B2 * | 3/2024 | Quynh | ................ | H04M 1/022 |
| 12,019,482 B2 * | 6/2024 | Feng | ................ | G06F 1/1616 |
| 12,032,417 B2 * | 7/2024 | Park | ................ | H04M 1/022 |
| 12,082,359 B2 * | 9/2024 | Wang | ................ | F16C 11/04 |
| 12,173,541 B2 * | 12/2024 | Chung | ................ | E05D 3/122 |
| 2020/0233466 A1 * | 7/2020 | Sanchez | ................ | H05K 5/0017 |
| 2021/0355988 A1 * | 11/2021 | Cheng | ................ | G06F 1/1681 |
| 2022/0120124 A1 * | 4/2022 | Quynh | ................ | E05D 3/122 |
| 2022/0400565 A1 * | 12/2022 | Shin | ................ | H04M 1/02 |
| 2023/0315163 A1 * | 10/2023 | Zhang | ................ | G06F 1/1652 |
| | | | | 361/679.27 |
| 2023/0403347 A1 * | 12/2023 | Liu | ................ | H04M 1/022 |
| 2024/0069604 A1 * | 2/2024 | Xu | ................ | G06F 1/1652 |
| 2024/0074075 A1 * | 2/2024 | Kim | ................ | G06F 1/1616 |
| 2024/0094785 A1 * | 3/2024 | Cheng | ................ | G06F 1/1652 |

FOREIGN PATENT DOCUMENTS

| | | | | | |
|---|---|---|---|---|---|
| CN | 111997991 | A | * | 11/2020 | ............ F16C 11/045 |
| CN | 112901643 | A | * | 6/2021 | ............ F16C 11/045 |
| CN | 111698355 | B | * | 7/2021 | ............ G06F 1/1641 |
| CN | 113194183 | A | * | 7/2021 | ............ G06F 1/1616 |

* cited by examiner

FOLDING MECHANISM AND ELECTRONIC DEVICE

CROSS-REFERENCE TO RELATED APPLICATIONS

This application is a continuation of PCT International Application No. PCT/CN2022/075344 filed on Feb. 7, 2022, which claims priority to Chinese Patent Application No. 202110185542.0 filed on Feb. 10, 2021, which are incorporated herein by reference in their entireties.

TECHNICAL FIELD

This application relates to the technical field of communications device, and specifically, to a folding mechanism and an electronic device.

BACKGROUND

Accompanied with the development of technologies, the development of electronic devices also becomes more and more rapid, and in addition, the requirements for the electronic devices by users also become higher and higher. At present, flexible screens are also widely applied to the electronic devices, to further form foldable electronic devices.

However, in a process of folding, the flexible screens are prone to being squeezed at bent portions to cause excessive bending, which eventually affects the life spans of the flexible screens.

SUMMARY

An objective of embodiments of this application is to provide a folding mechanism and an electronic device.

This application is implemented as follows:

In a first aspect, an embodiment of this application discloses a folding mechanism, including a base, a first housing seat, a second housing seat, a first screen supporting plate, and a second screen supporting plate, where:

the first housing seat is disposed on the first screen supporting plate, and the first screen supporting plate is rotatably fitted with the first housing seat;

the second housing seat is disposed on the second screen supporting plate, and the second screen supporting plate is rotatably fitted with the second housing seat;

the first housing seat and the first screen supporting plate are arranged on a first side of the base, and the second housing seat and the second screen supporting plate are arranged on a second side of the base, the first side and the second side being arranged facing away from each other;

the folding mechanism further includes a hinge mechanism, where the hinge mechanism includes a first swing arm, a second swing arm, a third swing arm, and a fourth swing arm, both the first swing arm and the third swing arm are arranged on a same side as the first housing seat, the second swing arm and the fourth swing arm are arranged on a same side as the second housing seat, the first swing arm is opposite to the second swing arm, and the third swing arm is opposite to the fourth swing arm;

a first end of the first swing arm is rotatably connected to the base, a second end of the first swing arm is rotatably connected to the first housing seat, a first end of the third swing arm is rotatably connected to the base, a second end of the third swing arm is in sliding fit with the first housing seat, a second end of the third swing arm is slidably and rotatably fitted with the first screen supporting plate, and a rotation axis of the first end of the first swing arm and a rotation axis of the first end of the third swing arm are distributed at an interval; and a first end of the second swing arm is rotatably connected to the base, a second end of the second swing arm is rotatably connected to the second housing seat, a first end of the fourth swing arm is rotatably connected to the base, a second end of the fourth swing arm is in sliding fit with the second housing seat, a second end of the fourth swing arm is slidably and rotatably fitted with the second screen supporting plate, and a rotation axis of the first end of the second swing arm and a rotation axis of the first end of the fourth swing arm are arranged at an interval.

In a second aspect, an embodiment of this application discloses an electronic device, including the folding mechanism described above, a flexible screen, a first housing, and a second housing. The first housing is fixedly connected to the first housing seat, the second housing is fixedly connected to the second housing seat, the first screen supporting plate is arranged between the first housing and the base, the second screen supporting plate is arranged between the second housing and the base, and the flexible screen is disposed on the base, the first housing, the second housing, the first screen supporting plate, and the second screen supporting plate.

The foldable electronic device according to this embodiment of this application is folded in an inward folding manner, that is, after folding of the foldable electronic device is completed, the flexible screen is stacked between a first folding part and a second folding part. In a process of folding the foldable electronic device, the rotation axis of the first end of the first swing arm and the rotation axis of the first end of the third swing arm are arranged at an interval and the rotation axis of the first end of the second swing arm and the rotation axis of the first end of the fourth swing arm are arranged at an interval; therefore, in a case that a user manipulates the first folding part to rotate relative to the second folding part, the first housing seat and the second housing seat may rotate relative to the base, the second end of the first swing arm rotates relative to the second end of the third swing arm, and the second end of the second swing arm rotates relative to the second end of the fourth swing arm, so that finally the second end of the third swing arm can be enabled to drive the first screen supporting plate to rotate relative to the first housing seat, and that the second end of the fourth swing arm can be enabled to drive the second screen supporting plate to rotate relative to the second housing seat.

DESCRIPTIONS OF REFERENCE NUMERALS

Figure 1:
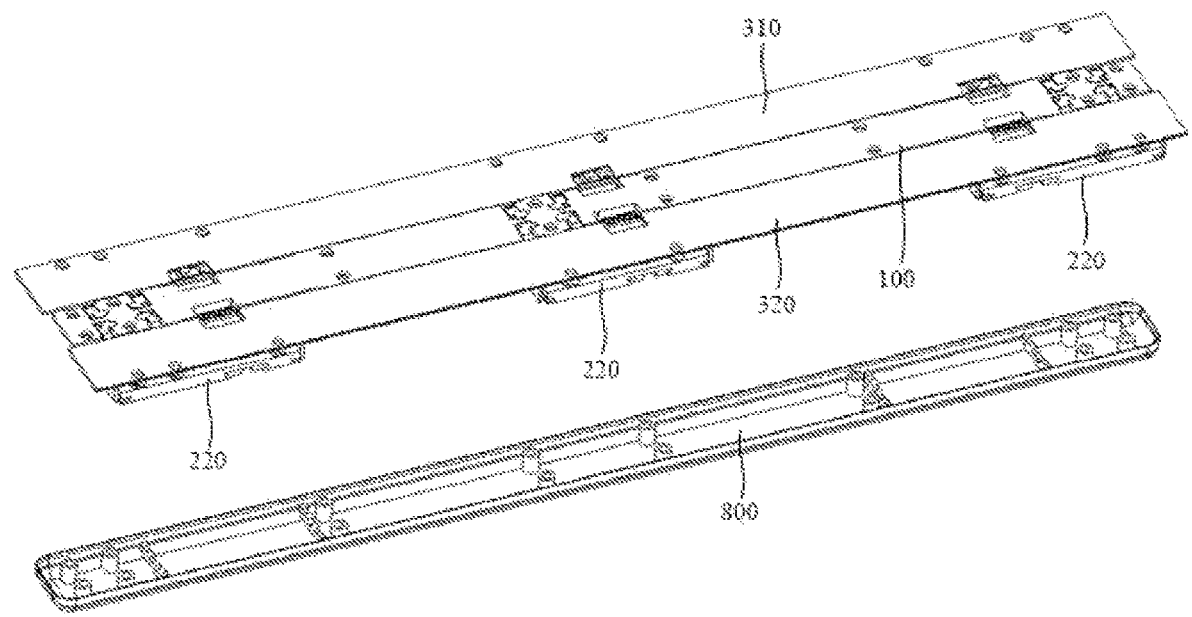
FIG. 1 is an exploded schematic diagram of a folding mechanism in an unfolded state disclosed in an embodiment of this application.

100—base, 100a—third rail body, 100b—fourth rail body,
210—first housing seat, 211—first sliding groove, 212—first avoidance hole, 210a—fifth sliding groove,
220—second housing seat, 221—second sliding groove, 222—second avoidance hole,
310—first screen supporting plate, 311—first rail body, 320—second screen supporting plate, 321—second rail body, 301—first retaining wall, 301a—fifth rail body, 302—second retaining wall, 302a—sixth rail body, 303—third retaining wall, 303a—seventh rail body, 304—fourth retaining wall, 304a—eighth rail body,
400—hinge mechanism,
410—first swing arm, 411—third sliding groove, 410a—first hinge shaft,
420—second swing arm, 421—fourth sliding groove, 420a—second hinge shaft,
430—third swing arm, 431—third meshing teeth, 432—first meshing teeth, 433—fifth meshing teeth, 430a—first slider,
440—fourth swing arm, 441—fourth meshing teeth, 442—second meshing teeth, 443—sixth meshing teeth, 440a—second slider,
451—first connecting shaft, 452—second connecting shaft, 453—third connecting shaft, 454—fourth connecting shaft,
460—gear mechanism, 461—first gear, 462—second gear,
471—first locating shaft sleeve, 472—second locating shaft sleeve,
481—first elastic member, 482—second elastic member, 483—third elastic member, 484—fourth elastic member,
491—first cam sleeve, 492—second cam sleeve, 493—third meshing teeth, 494—fourth meshing teeth, 495—seventh meshing teeth, 496—eighth meshing teeth;
500—flexible screen,
600—first housing, 610—first groove,
700—second housing, 710—second groove, and
800—cover body.

DETAILED DESCRIPTION

The technical solutions in embodiments of this application are clearly described in the following with reference to the accompanying drawings in this embodiment of this application. Apparently, the described embodiments are merely some rather than all of the embodiments of this application. All other embodiments obtained by a person of ordinary skill in the art based on this embodiment of this application shall fall within the protection scope of this application.

In the specification and claims of this application, the terms "first" and "second" are used to distinguish similar objects, but are unnecessarily used to describe a specific sequence or order. It is to be understood that data used in this way is exchangeable in a proper case, so that the embodiments of this application described herein can be implemented in an order different from the order shown or described herein, and in addition, the objects distinguished by "first" and "second" are generally one type, and the number of the objects is not limited, for example, there may be one first object, or a plurality of first objects. In addition, "and/or" used in this specification and the claims represents at least one of the connected objects, and the character "I" generally indicates that the associated objects are in an "or" relationship.

The folding mechanism and the electronic device provided in this embodiment of this application are described in detail below with reference to the accompanying drawings through specific embodiments and application scenarios thereof.

Figure 2:
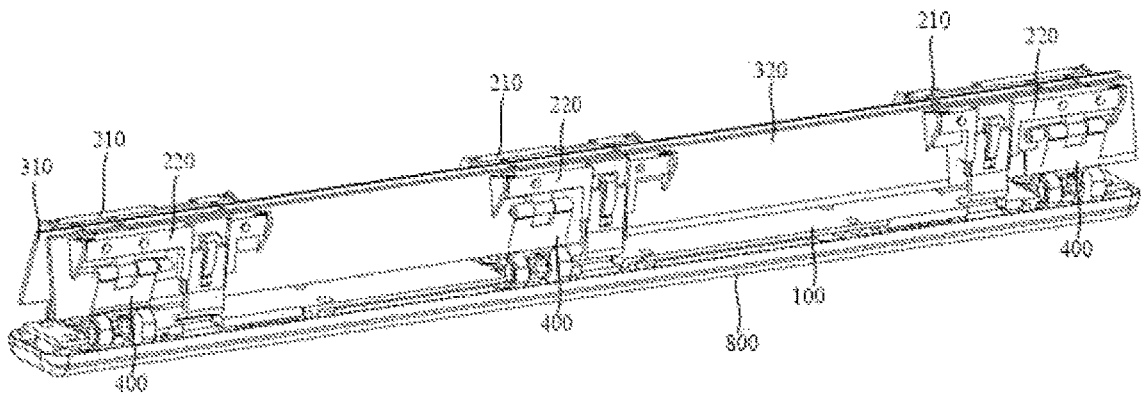
FIG. 2 is a schematic assembly diagram of a folding mechanism in a folded state disclosed in an embodiment of this application.
Figure 3:
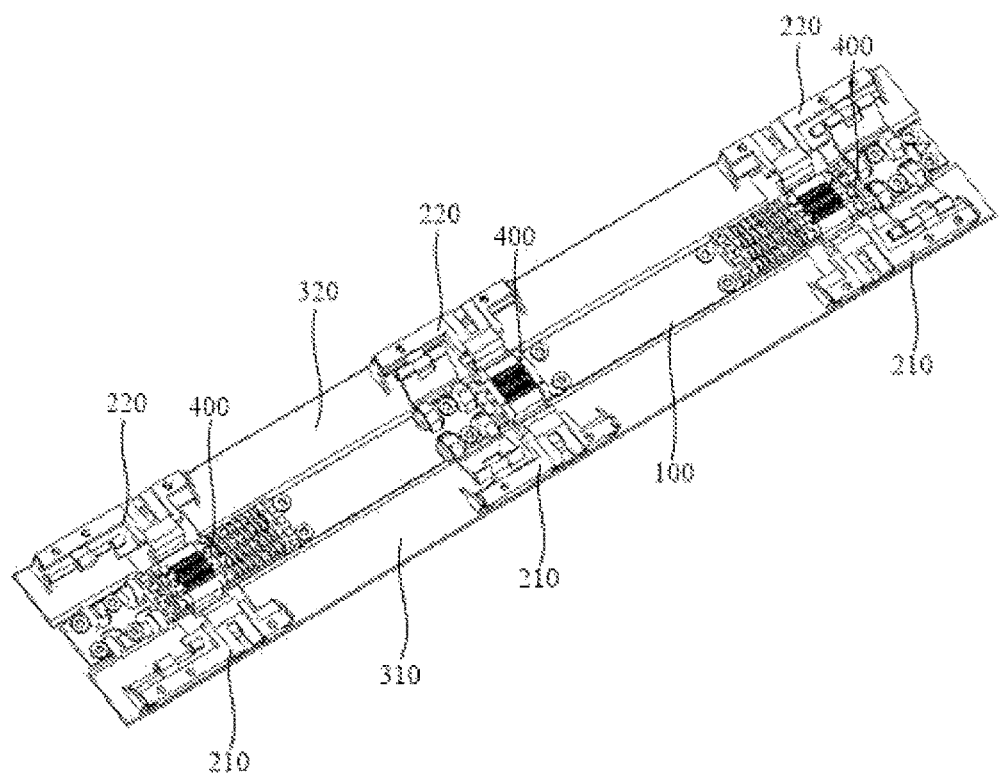
FIG. 3 to FIG. 5 are schematic structural diagrams of partial structures of a folding mechanism in an unfolded state at different viewing angles disclosed in an embodiment of this application.
Figure 4:
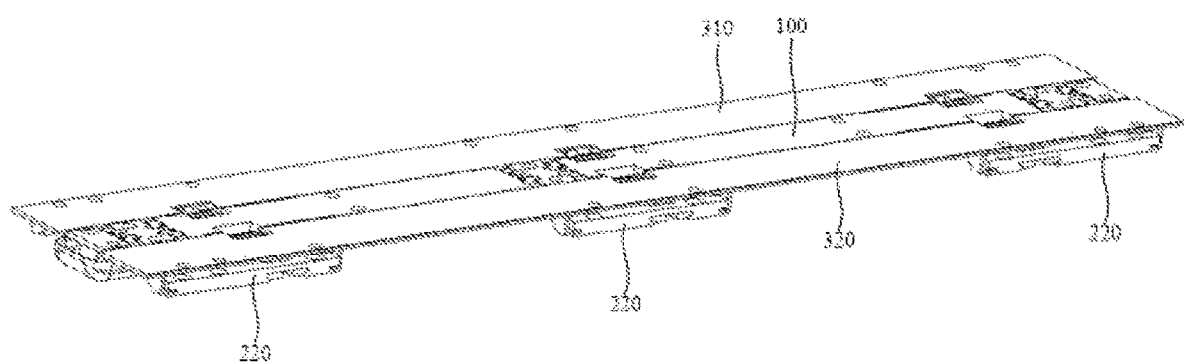
Figure 5:
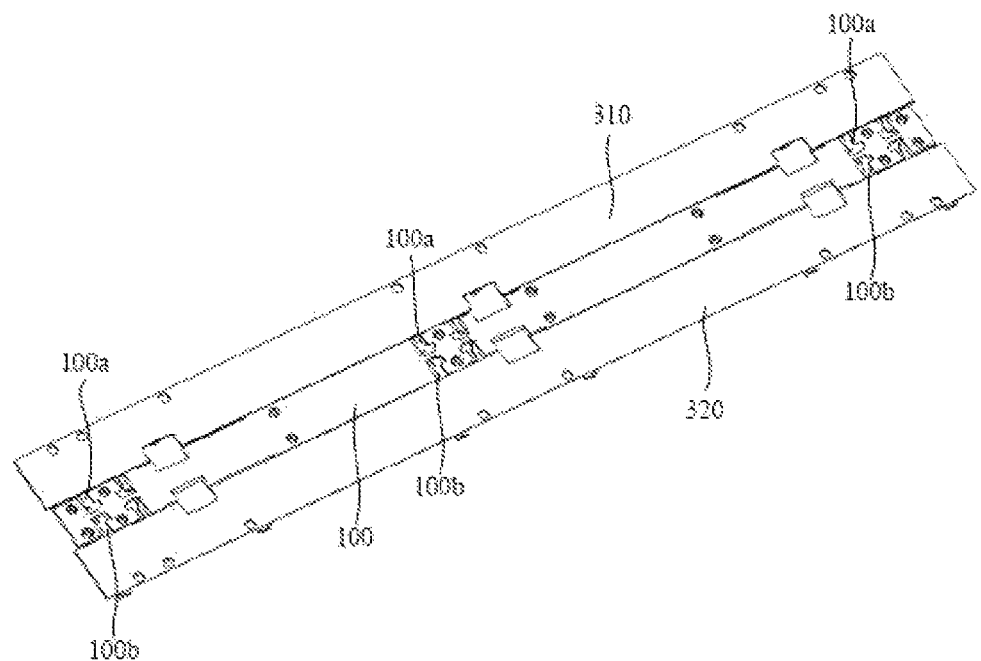
Figure 6:
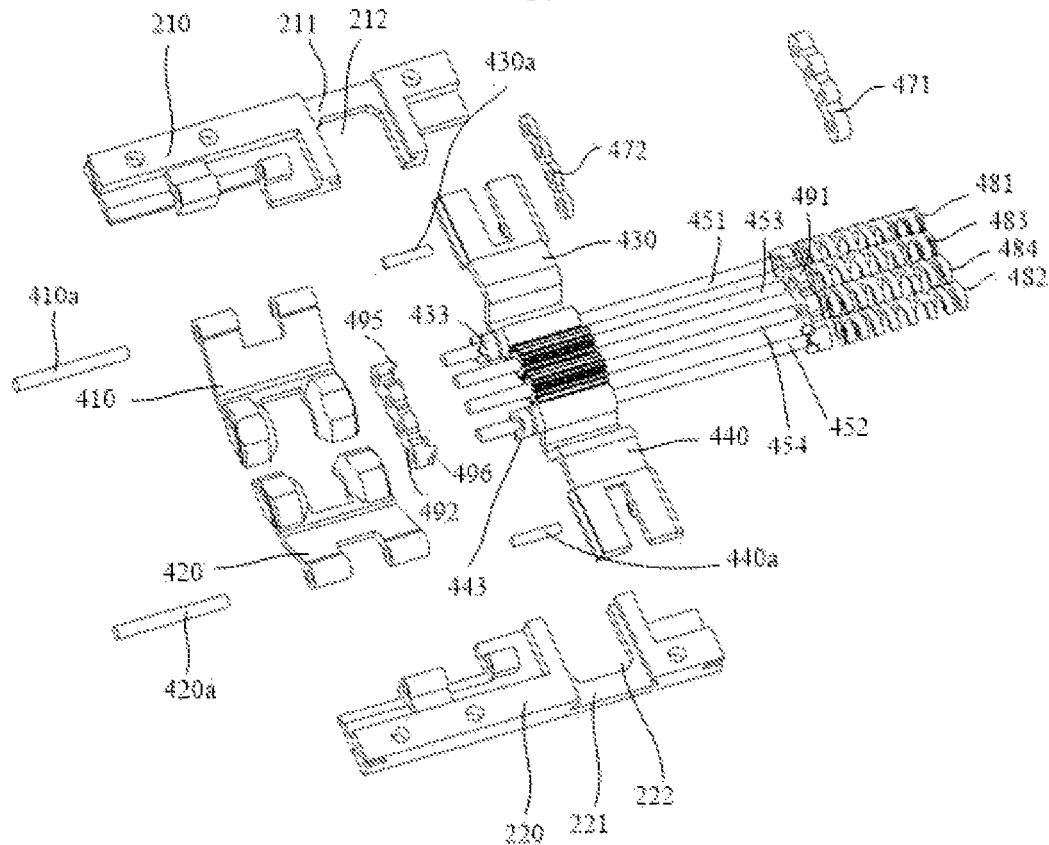
FIG. 6 is an exploded schematic diagram of a hinge mechanism, a first housing seat, and a second housing seat.
Figure 7:
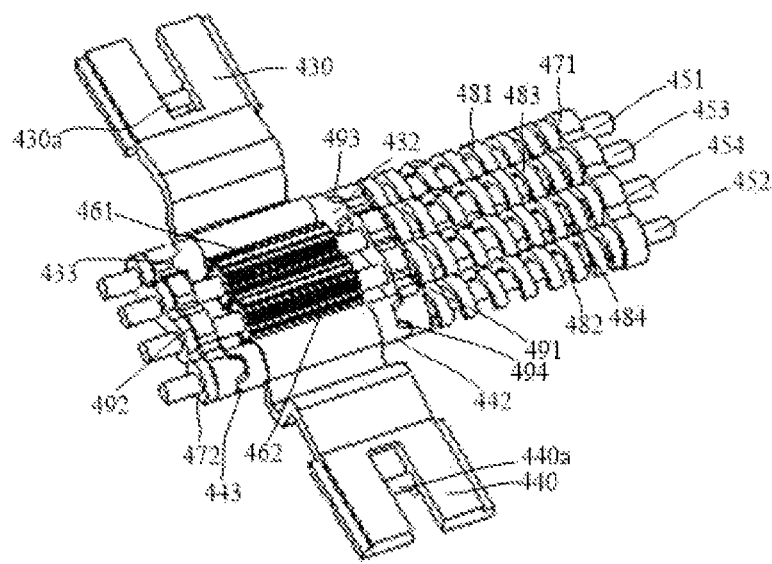
FIG. 7 is a schematic assembly diagram of a partial structure of the structure in FIG. 6.
Figure 8:
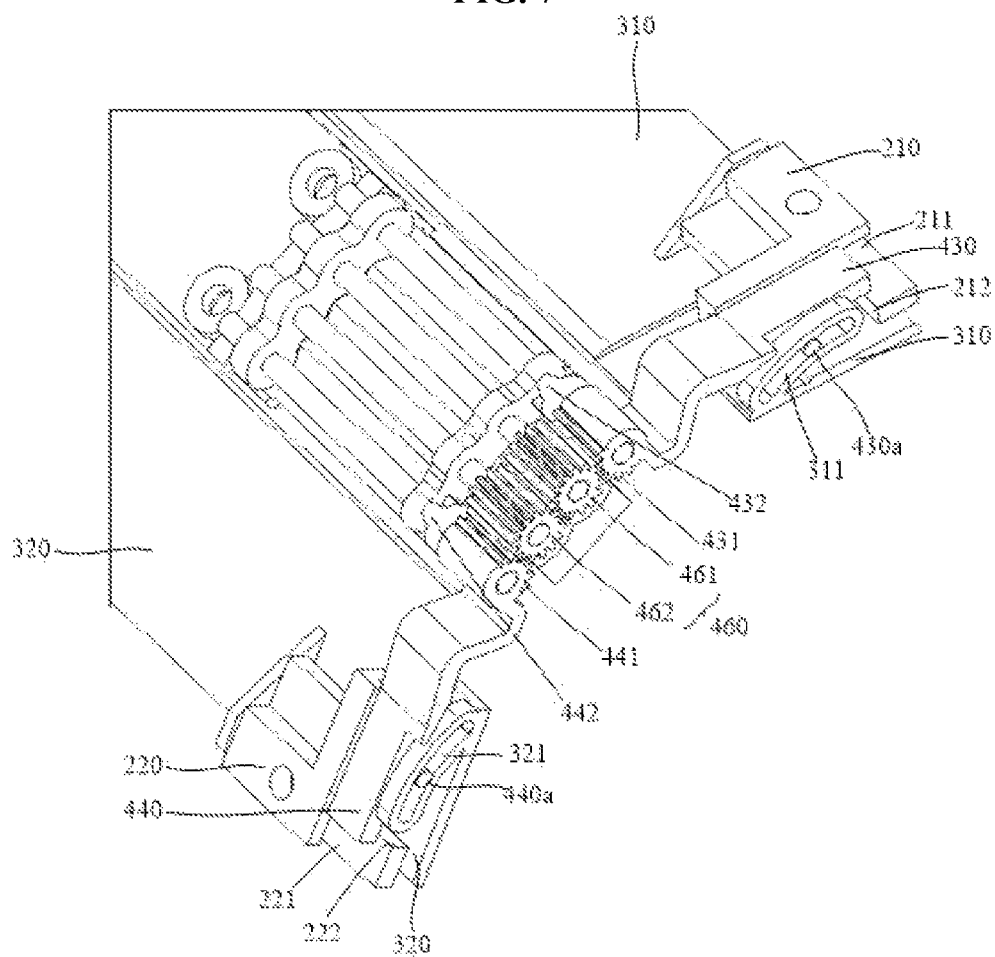
FIG. 8 and FIG. 9 are schematic structural diagrams of partial structures of the folding mechanism, respectively.
Figure 9:
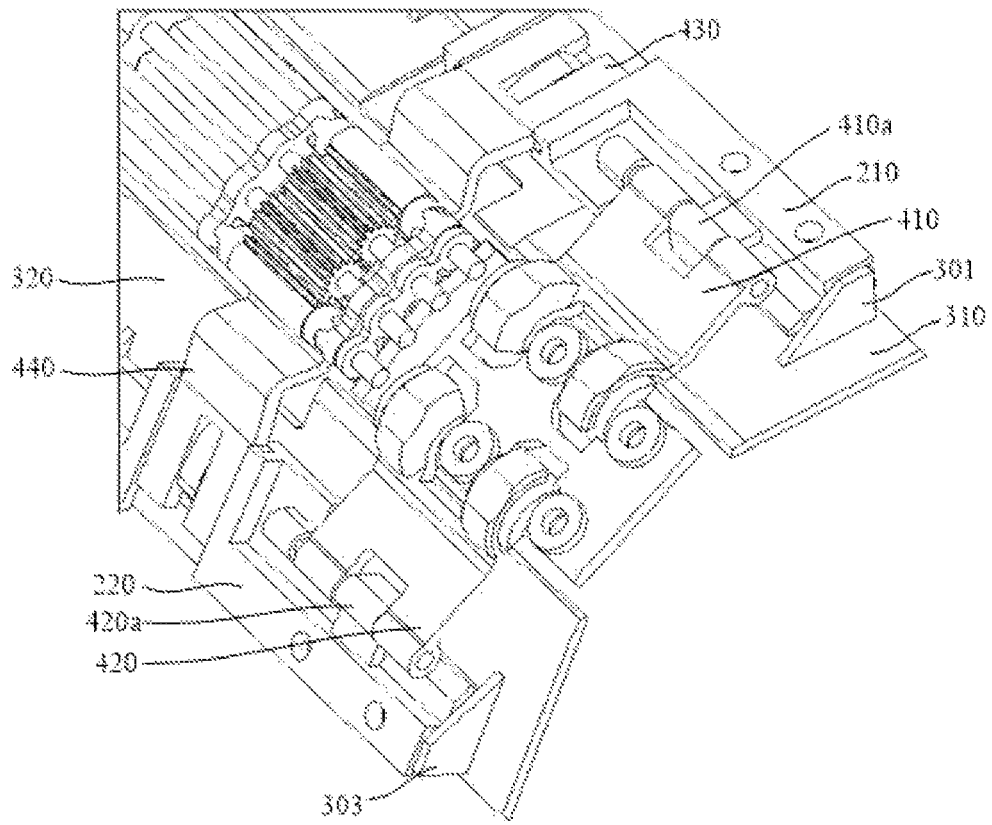
Figure 10:
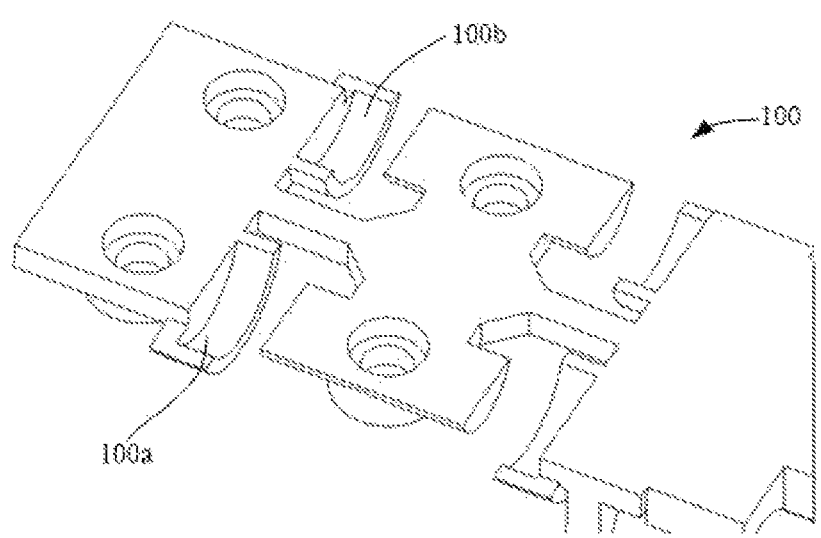
FIG. 10 is a schematic structural diagram of a partial structure of a base.
Figure 11:
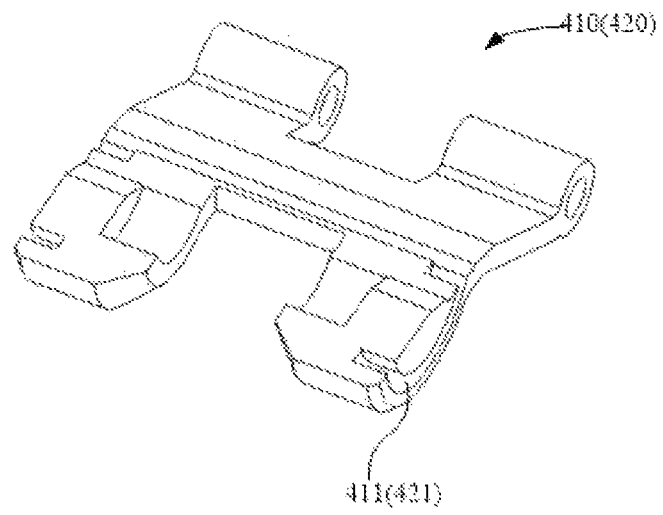
FIG. 11 is a schematic structural diagram of a first swing arm or a second swing arm.
Figure 12:
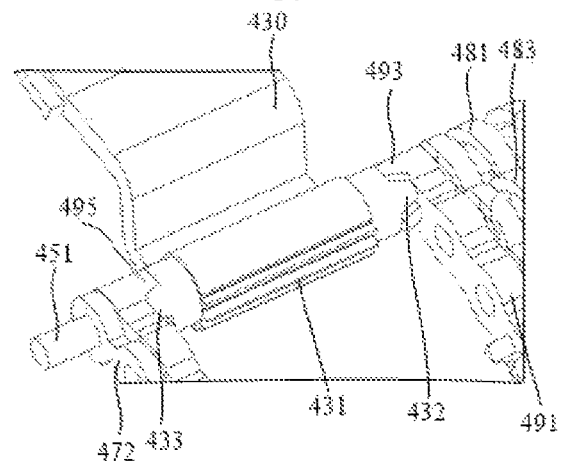
FIG. 12 and FIG. 13 are schematic partially enlarged diagrams of the folding mechanism, respectively.
Figure 13:
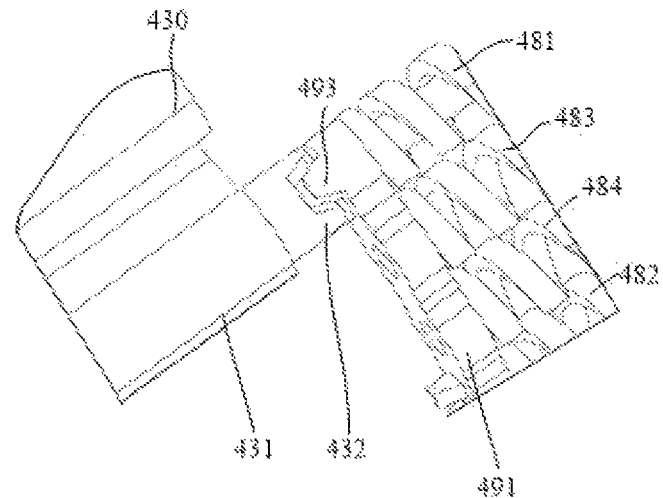
Figure 14:
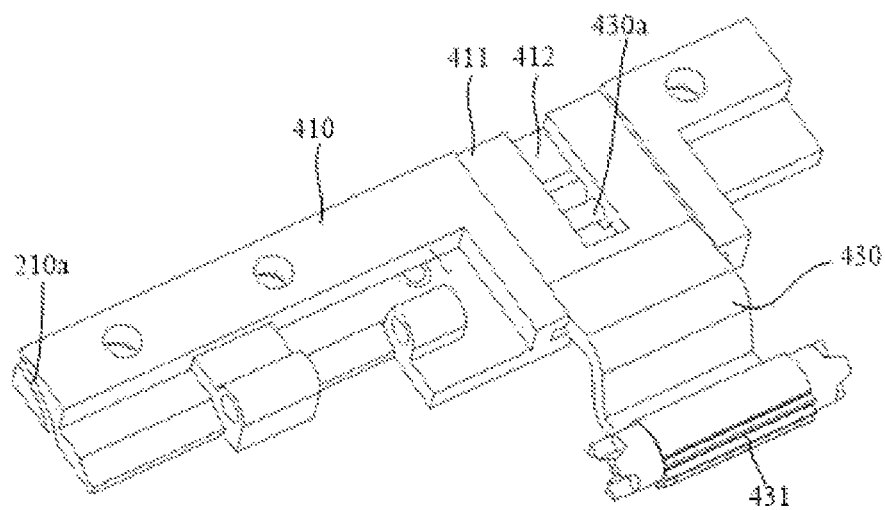
FIG. 14 is a schematic structural diagram of a first housing seat or a second housing seat.
Figure 15:
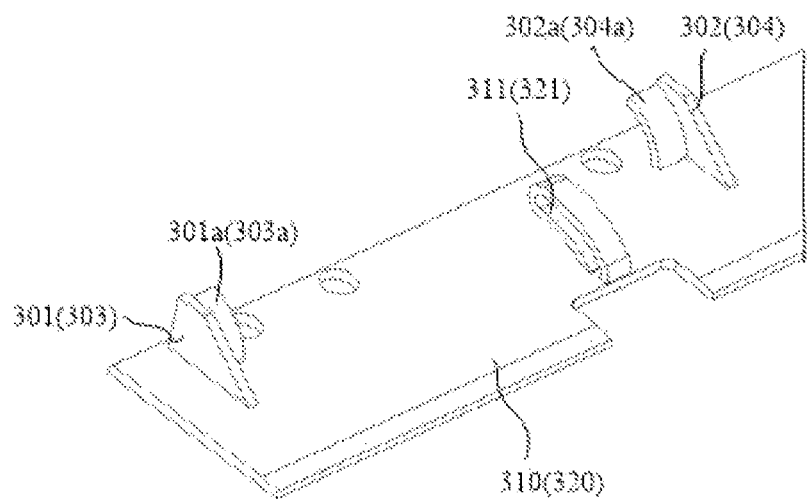
FIG. 15 is a schematic structural diagram of a partial structure of a first screen supporting plate or a second screen supporting plate.
Figure 16:
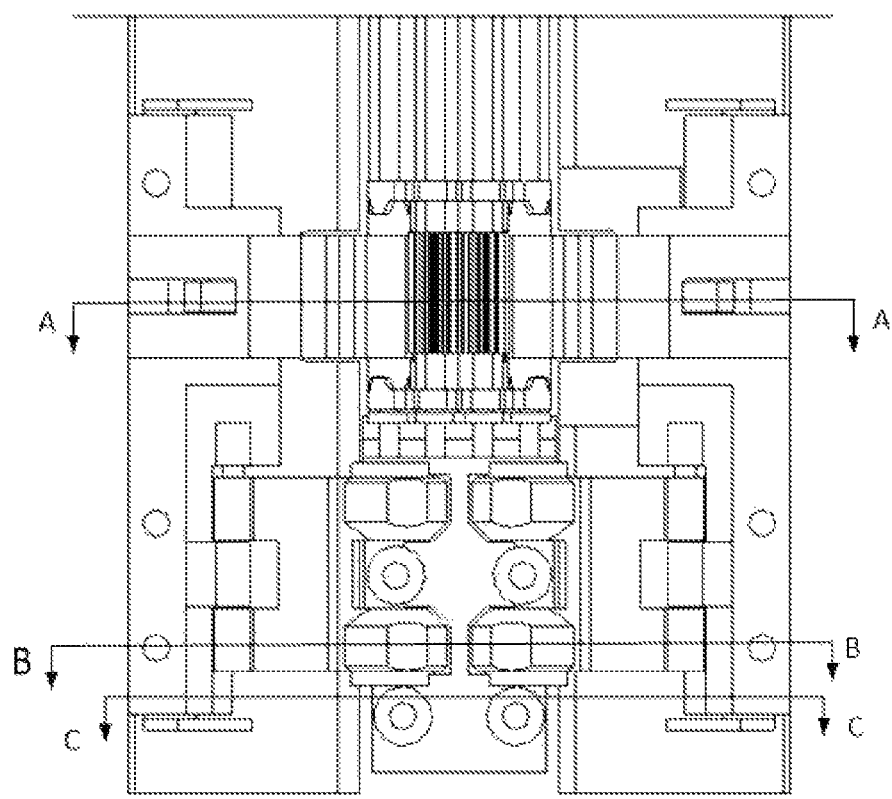
FIG. 16 is a schematic structural diagram of a folding mechanism in a unfolded state disclosed in an embodiment of this application.
Figure 17:
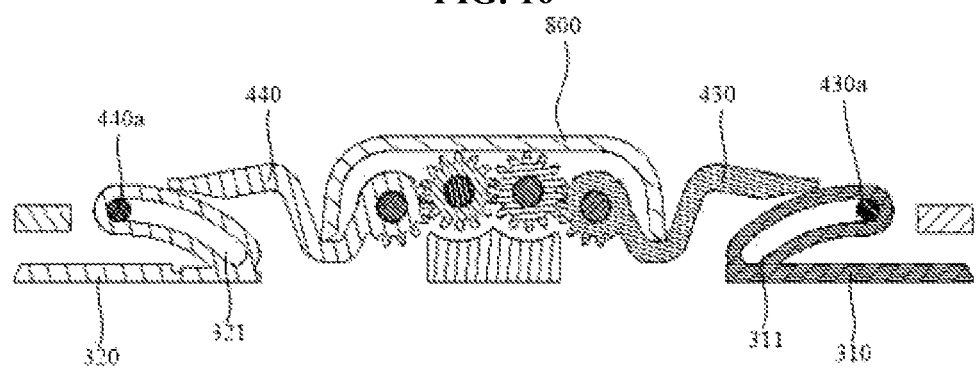
FIG. 17 is a cross-sectional view of FIG. 16 along a line A-A.
Figure 18:
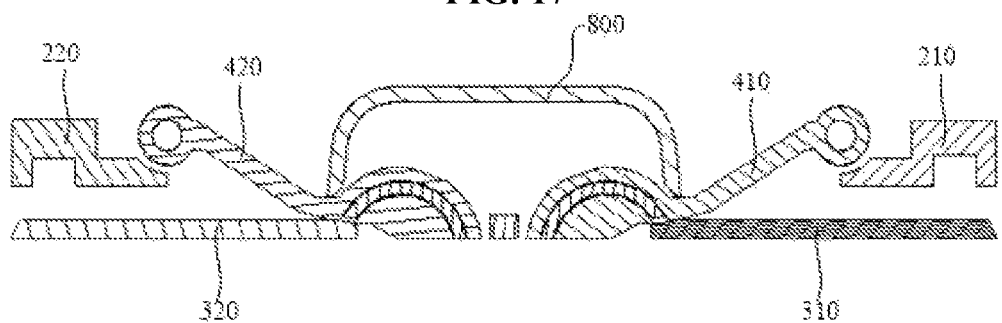
FIG. 18 is a cross-sectional view of FIG. 16 along a line B-B.
Figure 19:
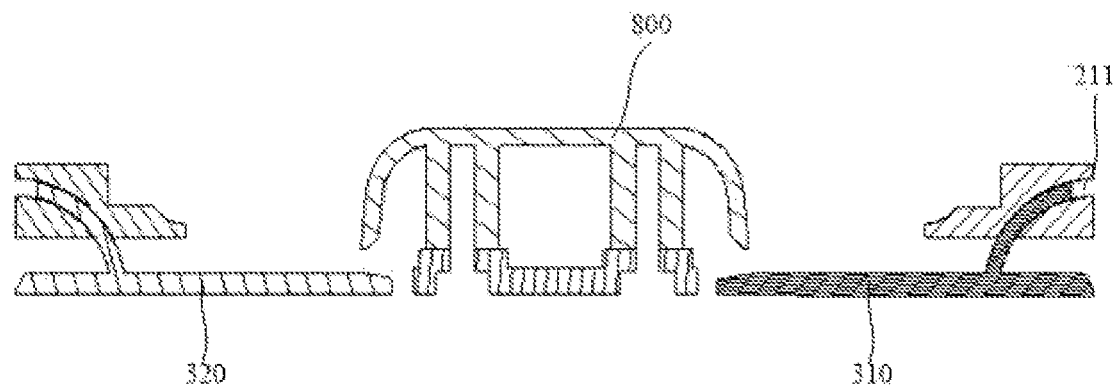
FIG. 19 is a cross-sectional view of FIG. 16 along a line C-C.
Figure 20:
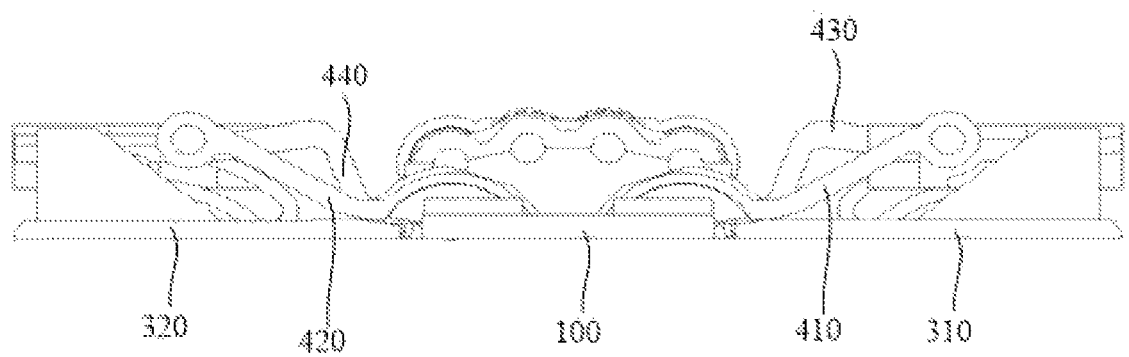
FIG. 20 is a schematic structural diagram of a folding mechanism in an unfolded state disclosed in an embodiment of this application.
Figure 21:
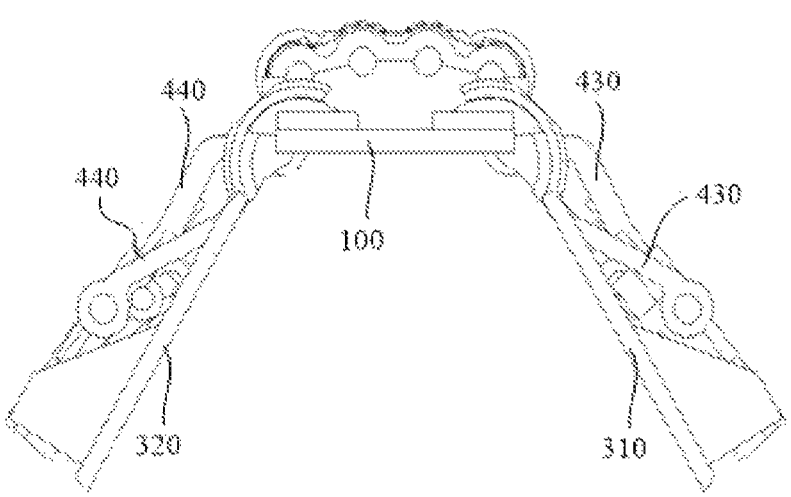
FIG. 21 is a schematic diagram of a folding process or an unfolding process of a folding mechanism disclosed in an embodiment of this application.
Figure 22:
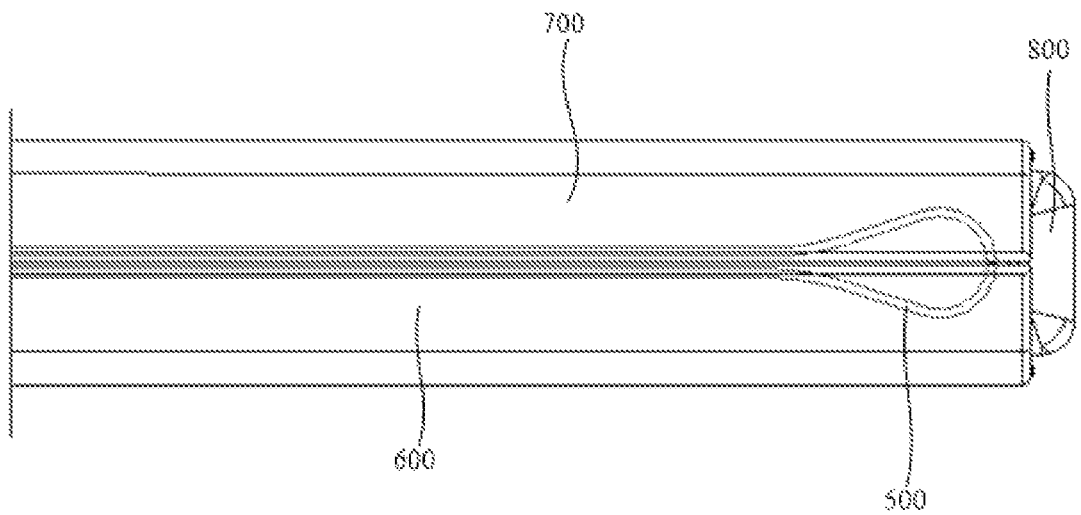
FIG. 22 is a schematic structural diagram of an electronic device in an unfolded state according to an embodiment of this application.
Figure 23:
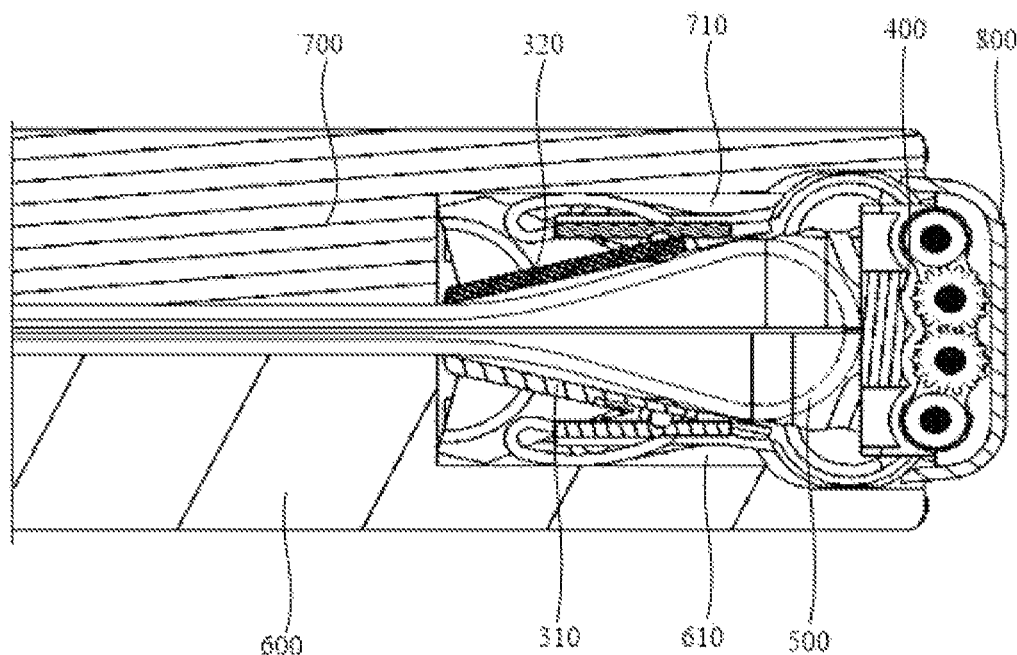
FIG. 23 is a cross-sectional view of FIG. 22.

As shown in FIG. 1 to FIG. 23, an embodiment of this application discloses a folding mechanism. The disclosed folding mechanism may be applied to a foldable electronic device, to implement folding and unfolding of the foldable electronic device.

The folding mechanism disclosed in this embodiment of this application includes a base 100, a first housing seat 210, a second housing seat 220, a first screen supporting plate 310, a second screen supporting plate 320, and a hinge mechanism 400.

The base 100 is a basic member of the folding mechanism. The base 100 can provide a mounting foundation for other components of the folding mechanism, thereby allowing the other components of the folding mechanism to be mounted directly or indirectly on the base 100. Optionally, the base 100 is a thin plate piece, to reduce an occupied space. Specifically, the base 100 may be a metal plate piece. The metal plate piece can enable the base 100 to have a sufficient strength even with a small thickness, and therefore does not affect a supporting performance of the base 100.

The foldable electronic device according to this embodiment of this application includes a first folding part, a second folding part, and a flexible screen 500.

In a case that the folding mechanism is in a folded state, the foldable electronic device is also in the folded state, so that the foldable electronic device is in a portable state. In this case, the first folding part is stacked with the second folding part, and the flexible screen 500 is folded by its own deformation.

In a case that the folding mechanism is in an unfolded state, the foldable electronic device is also in the unfolded state, and in this case, the first folding part and the second folding part are unfolded, so that the flexible screen 500 is unfolded by its own deformation, thereby achieving the purpose of displaying at a large area.

The first folding part and the second folding part are rotatably connected by a folding mechanism, and the first folding part rotates relative to the second folding part, so that the foldable electronic device can be switched between the unfolded state and the folded state. In other words, both the first folding part and the second folding part need to be connected to the folding mechanism.

The first folding part includes a first housing 600, and the second folding part includes a second housing 700. The first housing seat 210 is configured to be fixedly connected to the first housing 600, so as to implement an assembly connection between the folding mechanism and the first housing 600, and further implement an assembly connection between the folding mechanism and the first folding part. Optionally, the first housing seat 210 is connected to the first housing 600 in a fastening manner such as a threaded connector, clamping and fastening, bonding, or riveting. Certainly, the specific fastening manner between the first housing seat 210 and the first housing 600 is not limited in this embodiment of this application.

Similarly, the second housing seat 220 is configured to be fixedly connected to the second housing 700, so as to implement an assembly connection between the folding mechanism and the second housing 700, and further implement an assembly connection between the folding mechanism and the second folding part. Optionally, the second housing seat 220 is connected to the second housing 700 in a fastening manner such as a threaded connector, clamping and fastening, bonding, or riveting. Certainly, the specific fastening manner between the second housing seat 220 and second first housing 700 is not limited in this embodiment of this application.

As described above, the foldable electronic device includes a flexible screen 500. The first screen supporting plate 310 and the second screen supporting plate 320 are structural members of the folding mechanism for supporting the flexible screen 500. Certainly, the base 100 may also support the flexible screen 500. The first screen supporting plate 310 and the second screen supporting plate 320 can be fitted with the first housing 600 and the second housing 700 to support the entire flexible screen 500.

The first housing seat 210 is disposed on the first screen supporting plate 310, and the first screen supporting plate 310 is rotatably fitted with the first housing seat 210. Optionally, the first housing seat 210 is disposed on a back surface of the first screen supporting plate 310. The back surface of the first screen supporting plate 310 and a supporting surface of the first screen supporting plate 310 are distributed facing away from each other, and therefore such an assembling position can avoid the influence of the first housing seat 210 on a supporting function of the first screen supporting plate 310.

The second housing seat 220 is disposed on the second screen supporting plate 320, and the second screen supporting plate 320 is rotatably fitted with the second housing seat 220. Optionally, the second housing seat 220 is disposed on a back surface of the second screen supporting plate 320.

The back surface of the second screen supporting plate 320 and a supporting surface of the second screen supporting plate 320 are distributed facing away from each other, and therefore such an assembling position can avoid the influence of the second housing seat 220 on a supporting function of the second screen supporting plate 320.

In this embodiment of this application, the first housing seat 210 and the first screen supporting plate 310 are disposed on a first side of the base 100, so as to correspond to the first folding part. The second housing seat 220 and the second screen supporting plate 320 are disposed on a second side of the base 100, so as to correspond to the second folding part. It should be noted that: the first side and the second side are arranged facing away from each other.

In an optional solution, the first housing seat 210 and the second housing seat 220 may be symmetrically arranged on two sides of the base 100. Similarly, the first screen supporting plate 310 and the second screen supporting plate 320 may also be symmetrically arranged on two sides of the base 100. By such a symmetrical arrangement, the weight of the folding mechanism can be more balanced, thereby avoiding occurrence of a phenomenon of bias.

The hinge mechanism 400 disclosed in this embodiment of this application includes a first swing arm 410, a second swing arm 420, a third swing arm 430, and a fourth swing arm 440. The first swing arm 410 is opposite to the second swing arm 420, and the third swing arm 430 is opposite to the fourth swing arm 440.

Both the first swing arm 410 and the third swing arm 430 are arranged on a same side as the first housing seat 210, that is, the first swing arm 410, the third swing arm 430, and the first housing seat 210 are all located on the first side of the base 100.

Both the second swing arm 420 and the fourth swing arm 440 are arranged on a same side as the second housing seat 220, that is, the second swing arm 420, the fourth swing arm 440, and the second housing seat 220 are all located on the second side of the base 100.

A first end of the first swing arm 410 is rotatably connected to the base 100, so that the first swing arm 410 rotates about the base 100 by the first end thereof. A second end of the first swing arm 410 is rotatably connected to the first housing seat 210. Specifically, a second end of the first swing arm 410 may be hinged to the first housing seat 210 through a first hinge shaft 410a, so as to implement rotational connection.

A first end of the third swing arm 430 is rotatably connected to the base 100, so that the third swing arm 430 rotates about the base 100 by the first end thereof. A second end of the third swing arm 430 is in sliding fit with the first housing seat 210, so that the second end of the third swing arm 430 can slide relative to the first housing seat 210 during rotation. The second end of the third swing arm 430 is slidably and rotatably fitted with the first screen supporting plate 310, so that swinging of the second end of the third swing arm 430 can drive the first screen supporting plate 310 to rotate relative to the first housing seat 210 while implementing assembly and connection of the third swing arm 430 to the first screen supporting plate 310.

A rotation axis of the first end of the first swing arm 410 and a rotation axis of the first end of the third swing arm 430 are arranged at an interval, so that during a swinging process of the first swing arm 410 and the third swing arm 430, the second end of the first swing arm 410 and the second end of the third swing arm 430 can rotate relative to each other, thereby implementing driving of the first screen supporting plate 310 to rotate relative to the first housing seat 210.

Optionally, the rotation axis of the first end of the first swing arm 410 and the rotation axis of the first end of the third swing arm 430 are parallel to each other, which can better improve the stability of the first swing arm 410 and the third swing arm 430 during rotation.

A first end of the second swing arm 420 is rotatably connected to the base 100, so that the second swing arm 420 can rotate about the base 100 by the first end thereof. A second end of the second swing arm 420 is rotatably connected to the second housing seat 220. Specifically, the second end of the second swing arm 420 may be hinged to the second housing seat 220 through a second hinge shaft 420*a*, so as to implement rotational connection.

A first end of the fourth swing arm 440 is rotatably connected to the base 100, so that the fourth swing arm 440 rotates about the base 100 by the first end thereof. A second end of the fourth swing arm 440 is in sliding fit with the second housing seat 220, so that the second end of the fourth swing arm 440 can slide relative to the second housing seat 220 during rotation. The second end of the fourth swing arm 440 is slidably and rotatably fitted with the second screen supporting plate 320, so that swinging of the second end of the fourth swing arm 440 can drive the second screen supporting plate 320 to rotate relative to the second housing seat 220 while implementing assembly and connection of the fourth swing arm 440 to the second screen supporting plate 320.

A rotation axis of the first end of the second swing arm 420 and a rotation axis of the first end of the fourth swing arm 440 are arranged at an interval, so that during a swinging process of the second swing arm 420 and the fourth swing arm 440, the second end of the second swing arm 420 and the second end of the fourth swing arm 440 can rotate relative to each other, thereby implementing driving of the second screen supporting plate 320 to rotate relative to the second housing seat 220. Optionally, the rotation axis of the first end of the second swing arm 420 and the rotation axis of the first end of the fourth swing arm 440 is parallel to each other, which can better improve the stability of the second swing arm 420 and the fourth swing arm 440 during rotation.

The foldable electronic device according to this embodiment of this application is folded in an inward folding manner, that is, after folding of the foldable electronic device is completed, the flexible screen 500 is stacked between a first folding part and a second folding part. In a process of folding the foldable electronic device, the rotation axis of the first end of the first swing arm 410 and the rotation axis of the first end of the third swing arm 430 are arranged at an interval and the rotation axis of the first end of the second swing arm 420 and the rotation axis of the first end of the fourth swing arm 440 are arranged at an interval; therefore, in a case that a user manipulates the first folding part to rotate relative to the second folding part, both the first housing seat 210 and the second housing seat 220 rotate relative to the base 100, the second end of the first swing arm 410 rotates relative to the second end of the third swing arm 430, and the second end of the second swing arm 420 rotates relative to the second end of the fourth swing arm 440, so that finally the second end of the third swing arm 430 can be enabled to drive the first screen supporting plate 310 to rotate relative to the first housing seat 210, and that the second end of the fourth swing arm 440 can be enabled to drive the second screen supporting plate 320 to rotate relative to the second housing seat 220. In this case, an end of the first screen supporting plate 310 adjacent to the base 100 is far away from an end of the second screen supporting plate 320 adjacent to the base 100, and finally an accommodating space gradually expanding in a direction approaching the base 100 can be formed, which is further beneficial to providing a sufficient space for the bent portion of the flexible screen 500 in a folded state, thereby protecting the bent portion of the flexible screen 500 from damage caused by excessive squeezing.

In this process, the second end of the third swing arm 430 slides relative to the first housing seat 210, which can adapt to rotation of the first housing seat 210 driven by the second end of the first swing arm 410, so as to prevent the rotation of the first housing seat 210 from being locked. Similarly, the second end of the fourth swing arm 440 slides relative to the second housing seat 220, which can further adapt to rotation of the second housing seat 220 driven by the second end of the second swing arm 420, so as to prevent the rotation of the second housing seat 220 from being locked.

In addition, the first housing seat 210 is rotatably connected to the first swing arm 410 and the second housing seat 220 is rotatably connected to the second swing arm 420, and therefore, in a process in which a user manipulates the foldable electronic device to fold, the first housing seat 210 can rotate relative to the first swing arm 410 and the second housing seat 220 can rotate relative to the second swing arm 420, so that the first housing 600 connected to the first housing seat 210 and the second housing 700 connected to the second housing seat 220 can further rotate to positions closer to and parallel to each other, so as to avoid the problem that a tapered gap is generated between the first folding part and the second folding part after folding of the foldable electronic device is completed, thereby further preventing entering of a foreign matter.

In this embodiment of this application, the hinge mechanism 400 may further include a first connecting shaft 451 and a second connecting shaft 452. The first connecting shaft 451 and the second connecting shaft 452 are arranged at an interval on the base 100. Specifically, the first connecting shaft 451 and the second connecting shaft 452 may be secured on the base 100. Length directions of the first connecting shaft 451 and the second connecting shaft 452 may coincide with a length direction of the base 100.

The first end of the third swing arm 430 is rotatably connected to the first connecting shaft 451, so as to rotate about the first connecting shaft 451. The rotation axis of the first end of the third swing arm 430 is a central axis of the first connecting shaft 451. The first end of the fourth swing arm 440 is rotatably connected to the second connecting shaft 452, so as to rotate about the second connecting shaft 452. The rotation axis of the first end of the fourth swing arm 440 is a central axis of the second connecting shaft 452.

The first end of the third swing arm 430 is connected to the first end of the fourth swing arm 440 through a gear mechanism 460, and the third swing arm 430 and the fourth swing arm 440 rotate synchronously through the gear mechanism 460.

In a process of folding the foldable electronic device, meshing transmission between the third swing arm 430 and the fourth swing arm 440 is implemented through the gear mechanism 460, and finally rotation of the third swing arm 430 can be synchronous with rotation of the fourth swing arm 440, so that the first swing arm 410 and the second swing arm 420 can be restricted and follow synchronous rotation. By such the structure, the synchronous rotation of the first folding part and the second folding part can finally be implemented, thereby improving the folding effect.

In a further technical solution, the hinge mechanism 400 disclosed in this embodiment of this application may further include a third connecting shaft 453 and a fourth connecting shaft 454. The third connecting shaft 453 and the fourth connecting shaft 454 are arranged at an interval on the base 100, and the third connecting shaft 453 and the fourth connecting shaft 454 are located between the first connecting shaft 451 and the second connecting shaft 452. The first end of the third swing arm 430 is provided with third meshing teeth 431, the first end of the fourth swing arm 440 is provided with fourth meshing teeth 441, the third connecting shaft 453 is rotatably provided with a first meshing member, the first meshing member is a first gear 461, the fourth connecting shaft 454 is rotatably provided with a second meshing member, and the second meshing member is a second gear 462. The first meshing member is fitted with the second meshing member, the first meshing member is fitted with the third meshing teeth 431, and the second meshing member is fitted with the fourth meshing teeth 441. By such the structure, synchronous transmission can be implemented, the structure is simple, and a complicated synchronous transmission mechanism is not needed. Optionally, the third connecting shaft 453 and the fourth connecting shaft 454 may be secured on the base 100.

In a further technical solution, the hinge mechanism 400 may further include a first locating shaft sleeve 471 and a second locating shaft sleeve 472, and both the first locating shaft sleeve 471 and the second locating shaft sleeve 472 are disposed on the base 100. Both the first locating shaft sleeve 471 and the second locating shaft sleeve 472 are arranged at an interval and are connected to the first connecting shaft 451, the second connecting shaft 452, the third connecting shaft 453, and the fourth connecting shaft 454. The first end of the third swing arm 430, the first end of the fourth swing arm 440, the first meshing member, and the second meshing member are all arranged between the first locating shaft sleeve 471 and the second locating shaft sleeve 472, and are therefore restricted by the first locating shaft sleeve 471 and the second locating shaft sleeve 472, so as to prevent movable components from moving. Optionally, the first locating shaft sleeve 471 and the second locating shaft sleeve 472 may be fixedly secured on the base 100.

In a further technical solution, the hinge mechanism 400 disclosed in this embodiment of this application may further include a first elastic member 481 and a second elastic member 482. The first elastic member 481 is elastically located between the first end of the third swing arm 430 and the first locating shaft sleeve 471, and the second elastic member 482 is elastically located between the first end of the fourth swing arm 440 and the first locating shaft sleeve 471. The first elastic member 481 and the second elastic member 482 are in a compressed state. Elastic forces of the first elastic member 481 and the second elastic member 482 can elastically support the first end of the third swing arm 430 and the first end of the fourth swing arm 440, so that the third swing arm 430 and the fourth swing arm 440 can receive elastic resistance during rotation, thereby generating damping, and finally the first folding part and the second folding part can hover during an unfolding or folding process, so that the foldable electronic device can be held at a plurality of angles, so as to meet more unfolding requirements of users.

In an optional solution, a first side surface of the first end of the third swing arm 430 is provided with first meshing teeth 432, and a first side surface of the first end of the fourth swing arm 440 is provided with second meshing teeth 442. The hinge mechanism 400 may further include a first cam sleeve 491. The first cam sleeve 491 is provided with third meshing teeth 493 and fourth meshing teeth 494. The third meshing teeth 493 is opposite to the first meshing teeth 432. The fourth meshing teeth 494 is opposite to the second meshing teeth 442. The first elastic member 481 and the second elastic member 482 are elastically arranged between the first cam sleeve 491 and the first locating shaft sleeve 471. Both the first elastic member 481 and the second elastic member 482 are in a compressed state, the third meshing teeth 493 are meshed with the first meshing teeth 432, and the fourth meshing teeth 494 are meshed with the second meshing teeth 442.

In this case, tensions applied by the first elastic member 481 and the second elastic member 482 can cause the third meshing teeth 493 to be elastically fitted with the first meshing teeth 432, and the fourth meshing teeth 494 to be elastically fitted with the second meshing teeth 442. In this case, elastic engagement can further increase damping of the third swing arm 430 and the fourth swing arm 440, so that the first folding part and the second folding part can be better hovered during an unfolding or folding process, and a current unfolding angle can be better maintained.

In a further technical solution, a second side surface of the first end of the third swing arm 430 is provided with fifth meshing teeth 433, and a second side surface of the first end of the fourth swing arm 440 is provided with sixth meshing teeth 443. It should be noted that: a first side surface of the first end of the third swing arm 430 is distributed facing away from a second side surface of the first end of the third swing arm 430.

The hinge mechanism 400 disclosed in this embodiment of this application may further include a second cam sleeve 492. The second cam sleeve 492 is provided with seventh meshing teeth 495 and eighth meshing teeth 496. The seventh meshing teeth 495 are arranged opposite to the fifth meshing teeth 433. The eighth meshing teeth 496 are arranged opposite to the sixth meshing teeth 443. A first part of the second cam sleeve 492 is located between the second locating shaft sleeve 472 and the first end of the third swing arm 430. A second part of the second cam sleeve 492 is located between the second locating shaft sleeve 472 and the first end of the fourth swing arm 440. The first elastic member 481 and the second elastic member 482 are in a compressed state, the eighth meshing teeth 496 are elastically meshed with the sixth meshing teeth 443, and the seventh meshing teeth 495 are elastically meshed with the fifth meshing teeth 433. In this case, in coordination with the first cam sleeve 491 and the second cam sleeve 492, the seventh meshing teeth 495 and the eighth meshing teeth 496 can be better restricted from rotating randomly, thereby achieving a better damping effect.

In this embodiment of this application, the first elastic member 481 can be sleeved on the first connecting shaft 451, and the second elastic member 482 can be sleeved on the second connecting shaft 452, so as to achieve a more compact assembly. Optionally, the first elastic member 481 and the second elastic member 482 can be made more compact and deformed more standardized.

The hinge mechanism 400 disclosed in this embodiment of this application may further include a third elastic member 483 and a fourth elastic member 484. The third elastic member 483 is sleeved on the third connecting shaft 453, the fourth elastic member 484 is sleeved on the fourth connecting shaft 454, and the first elastic member 481, the second elastic member 482, the third elastic member 483, and the fourth elastic member 484 are elastically located between the first locating shaft sleeve 471 and the gear mechanism 460. Apparently, in this case, an increase in the number of the third elastic members 483 and the number of the fourth elastic members 484 can provide greater elastic force to further provide greater damping, thereby achieving a better hovering effect.

As described above, the second end of the third swing arm 430 can slide relative to the first housing seat 210. On the basis of this, to improve a matching effect, in an optional solution, the first housing seat 210 may be provided with a first sliding groove 211. The second end of the third swing arm 430 is in sliding fit with the first sliding groove 211.

In a further technical solution, an inner wall of the first sliding groove 211 is provided with a first avoidance hole 212, a first rail body 311 is secured to the first screen supporting plate 310, a second end of the third swing arm 430 is provided with a first slider 430a, the first rail body 311 passes through the first avoidance hole 212 to at least partially extend into the first sliding groove 211, and the first slider 430a is slidably and rotatably fitted with the first rail body 311. Such the structure is relatively simple, and can meet the assembly requirement that the second end of the third swing arm 430 is slidably and rotatably fitted with the first screen supporting plate 310. Specifically, the first rail body 311 is a curved structure, and the first slider 430a can slide inside the first rail body 311 during rotation of the third swing arm 430. By such the structure, the structure of the first sliding groove 211 can be fully utilized, and the first avoidance hole 212 is provided on a bottom wall of the first sliding groove 211, to implement the assembly, which is beneficial to a more compact assembly structure.

Similarly, the second housing seat 220 is provided with a second sliding groove 221, and the second end of the fourth swing arm 440 is in sliding fit with the second sliding groove 221. By such the structure, the stability of sliding fit can be improved.

In a further technical solution, an inner wall of the second sliding groove 221 is provided with a second avoidance hole 222, a second rail body 321 is secured to the second screen supporting plate 320, a second end of the fourth swing arm 440 is provided with a second slider 440a, the second rail body 321 passes through the second avoidance hole 222 to at least partially extend into the second sliding groove 221, and the second slider 440a is slidably and rotatably fitted with the second rail body 321.

In this embodiment of this application, the base 100 may be provided with a third rail body 100a and a fourth rail body 100b, the first end of the first swing arm 410 is provided with a third sliding groove 411, and the first end of the second swing arm 420 is provided with a fourth sliding groove 421, or the base 100 is provided with a third sliding groove 411 and a fourth sliding groove 421, the first end of the first swing arm 410 is provided with a third rail body 100a, and the first end of the second swing arm 420 is provided with a fourth rail body 100b, where: the third rail body 100a is slidably and rotatably fitted with the third sliding groove 411, and the fourth rail body 100b is slidably and rotatably fitted with the fourth sliding groove 421. In this way, rotation connection between the first swing arm 410 and the base 100 and between the second swing arm 420 and the base 100 can be implemented, and the structure is simple.

As described above, the first screen supporting plate 310 is rotatably connected to the first housing seat 210. There are many ways to implement rotation connection between the first screen supporting plate 310 and the first housing seat 210. In an optional solution, the first screen supporting plate 310 is provided with a first retaining wall 301 and a second retaining wall 302, the first retaining wall 301 and the second retaining wall 302 are arranged opposite to each other, and the first housing seat 210 is arranged between the first retaining wall 301 and the second retaining wall 302, where:

the first retaining wall 301 is provided with a fifth rail body 301a, the second retaining wall 302 is provided with a sixth rail body 302a, the first housing seat 210 is provided with a fifth sliding groove 210a and a sixth sliding groove, the fifth rail body 301a is in sliding fit with the fifth sliding groove 210a, and the sixth rail body 302a is in sliding fit with the sixth sliding groove, to further implement rotation fit; or, the first retaining wall 301 is provided with a fifth sliding groove 210a, the second retaining wall 302 is provided with a sixth sliding groove, the first housing seat 210 is provided with a fifth rail body 301a and a sixth rail body 302a, the fifth rail body 301a is in sliding fit with the fifth sliding groove 210a, and the sixth rail body 302a is in sliding fit with the sixth sliding groove, to further implement rotation fit.

By the foregoing structure, not only rotational connection between the first screen supporting plate 310 and the first housing seat 210 can be implemented, but also a constraint space can be formed between the first retaining wall 301 and the second retaining wall 302, so that the rotational connection between the first screen supporting plate 310 and the first housing seat 210 can be more stable, and in addition, no special hinge shaft needs to be disposed, thereby simplifying the structure.

Similarly, in an optional solution, the second screen supporting plate 320 is provided with a third retaining wall 303 and a fourth retaining wall 304, the third retaining wall 303 and the fourth retaining wall 304 are arranged opposite to each other, and the second housing seat 220 is arranged between the third retaining wall 303 and the fourth retaining wall 304, where: the third retaining wall 303 is provided with a seventh rail body 303a, the fourth retaining wall 304 is provided with an eighth rail body 304a, the second housing seat 220 is provided with a seventh sliding groove and an eighth sliding groove, the seventh rail body 303a is in sliding fit with the seventh sliding groove, and the eighth rail body 304a is in sliding fit with the eighth sliding groove; or, the third retaining wall 303 is provided with a seventh sliding groove, the fourth retaining wall 304 is provided with an eighth sliding groove, the second housing seat 220 is provided with a seventh rail body 303a and an eighth rail body 304a, the seventh rail body 303a is in sliding fit with the seventh sliding groove, and the eighth rail body 304a is in sliding fit with the eighth sliding groove. Such a situation in which the second housing seat 220 is arranged between the third retaining wall 303 and the fourth retaining wall 304 is beneficial to improving the assembly performance, and such the manner of implementing rotation by sliding is also convenient for assembly while ensuring the degree of freedom.

The folding mechanism disclosed in this embodiment of this application may further include a cover body 800, where the cover body 800 is secured on the base 100, and the cover body 800 can cover the hinge mechanism 400, so as to prevent the hinge mechanism 400 from being exposed and in addition protect the hinge mechanism 400.

In the folding mechanism disclosed in this embodiment of this application, there are at least two hinge mechanisms 400, and the at least two hinge mechanisms are arranged at an interval. By such the structure, more stable rotational connection and assembling can be implemented through the plurality of hinge mechanisms 400.

As described above, the folding mechanism disclosed in this embodiment of this application has a folded state and an unfolded state. In the folded state, a distance between a first end of the first screen supporting plate 310 and a first end of the second screen supporting plate 320 is a first distance, a distance between a second end of the first screen supporting plate 310 and a second end of the second screen supporting plate 320 is a second distance, the first distance is greater than the second distance, and the second distance is relatively small and approaches zero. Certainly, the second distance may be zero. The first end of the first screen supporting plate 310 is an end of the first screen supporting plate 310 adjacent to the base 100, the second end of the first screen supporting plate 310 is the other end of the second screen supporting plate 320 away from the base 100, the first end of the second screen supporting plate 320 is an end of the second screen supporting plate 320 adjacent to the base 100, and the second end of the second screen supporting plate 320 is the other end of the second screen supporting plate 320 away from the base 100.

In the unfolded state, the support surface of the first screen supporting plate 310 is coplanar with the support surface of the second screen supporting plate 320, the support surface of the first screen supporting plate 310 is arranged facing away from the back surface of the first screen supporting plate 310, and the support surface of the second screen supporting plate 320 is arranged facing away from the back surface of the second screen supporting plate 320. In this case, in a case that the folding mechanism is in the folded state, an accommodating space of the first screen supporting plate 310 and the second screen supporting plate 320 gradually expanding in a direction approaching the base 100. In the unfolded state, a supporting structure having a large area can be formed in a coplanar form, thereby implementing auxiliary support for the flexible screen.

Based on the folding mechanism disclosed in this embodiment of this application, the embodiments of this application disclose an electronic device, and the disclosed electronic device includes the folding mechanism described in the foregoing embodiments.

The electronic device disclosed in this embodiment of this application further includes a first folding part and a second folding part. The first folding part includes a first housing 600, the second folding part includes a second housing 700, the first housing 600 is fixedly connected to the first housing seat 210, the second housing 700 is fixedly connected to the second housing seat 220, the first screen supporting plate 310 is arranged between the first housing 600 and the base 100, the second screen supporting plate 320 is arranged between the second housing 700 and the base 100, and the flexible screen 500 is disposed on the base 100, the first housing 600, the second housing 700, the first screen supporting plate 310, and the second screen supporting plate 320.

In an optional solution, the first housing 600 may be provided with a first groove 610, the second housing 700 may be provided with a second groove 710, the first screen supporting plate 310 is located in the first groove 610, and the second screen supporting plate 320 is located in the second groove 710. In a case that the electronic device is in the folded state, the first housing 600 and the second housing 700 are stacked. The first screen supporting plate 310 and the second screen supporting plate 320 are respectively located in the first groove 610 and the second groove 710, and therefore a slit between the first housing 600 and the second housing 700 can be smaller and can be almost attached after the electronic device is folded. It can be seen that the electronic device disclosed in this embodiment of this application can better solve the problem in the related art that a slit having an inconsistent width is formed between two folded parts of the electronic device after being folded.

The electronic device disclosed in this embodiment of this application may be a mobile phone, a computer, an eBook reader, a wearable device, and the like. The specific type of the electronic device is not limited in this embodiment of this application.

It should be noted that: the terms "include", "comprise", or any other variation thereof in this specification is intended to cover a non-exclusive inclusion, so that the stated processes, methods, objects, or apparatuses including a series of elements not only include those elements, but also include other elements not explicitly listed, or further include elements inherent to such the processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in this embodiment of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, the features described with reference to some examples can be combined in other examples.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A folding mechanism, comprising a base, a first housing seat, a second housing seat, a first screen supporting plate, and a second screen supporting plate, wherein:
    the first housing seat is disposed on the first screen supporting plate, and the first screen supporting plate is rotatably fitted with the first housing seat;
    the second housing seat is disposed on the second screen supporting plate, and the second screen supporting plate is rotatably fitted with the second housing seat;
    the first housing seat and the first screen supporting plate are arranged on a first side of the base, and the second housing seat and the second screen supporting plate are arranged on a second side of the base, the first side and the second side being arranged facing away from each other;
    the folding mechanism further comprises a hinge mechanism, wherein the hinge mechanism comprises a first swing arm, a second swing arm, a third swing arm, and a fourth swing arm, both the first swing arm and the third swing arm are arranged on a same side as the first housing seat, the second swing arm and the fourth swing arm are arranged on a same side as the second housing seat, the first swing arm is opposite to the second swing arm, and the third swing arm is opposite to the fourth swing arm;

a first end of the first swing arm is rotatably connected to the base, a second end of the first swing arm is rotatably connected to the first housing seat, a first end of the third swing arm is rotatably connected to the base, a second end of the third swing arm is in sliding fit with the first housing seat, a second end of the third swing arm is slidably and rotatably fitted with the first screen supporting plate, and a rotation axis of the first end of the first swing arm and a rotation axis of the first end of the third swing arm are distributed at an interval; and a first end of the second swing arm is rotatably connected to the base, a second end of the second swing arm is rotatably connected to the second housing seat, a first end of the fourth swing arm is rotatably connected to the base, a second end of the fourth swing arm is in sliding fit with the second housing seat, a second end of the fourth swing arm is slidably and rotatably fitted with the second screen supporting plate, and a rotation axis of the first end of the second swing arm and a rotation axis of the first end of the fourth swing arm are arranged at an interval.

2. The folding mechanism according to claim 1, wherein the hinge mechanism further comprises a first connecting shaft and a second connecting shaft, the first connecting shaft and the second connecting shaft are arranged at an interval on the base, wherein:

a first end of the third swing arm is rotatably connected to the first connecting shaft, and a rotation axis of the first end of the third swing arm is a central axis of the first connecting shaft, and a first end of the fourth swing arm is rotatably connected to the second connecting shaft, and a rotation axis of the first end of the fourth swing arm is a central axis of the second connecting shaft; and the first end of the third swing arm is connected to the first end of the fourth swing arm through a gear mechanism, and the third swing arm rotates synchronously with the fourth swing arm through the gear mechanism.

3. The folding mechanism according to claim 2, wherein the hinge mechanism further comprises a third connecting shaft and a fourth connecting shaft, the third connecting shaft and the fourth connecting shaft are arranged at an interval on the base, the first end of the third swing arm is provided with third meshing teeth, the first end of the fourth swing arm is provided with fourth meshing teeth, the third connecting shaft is rotatably provided with a first meshing member, the fourth connecting shaft is rotatably provided with a second meshing member, the first meshing member is meshed with the second meshing member, the first meshing member is meshed with the third meshing teeth, and the second meshing member is meshed with the fourth meshing teeth.

4. The folding mechanism according to claim 3, wherein the hinge mechanism further comprises a first locating shaft sleeve and a second locating shaft sleeve, both the first locating shaft sleeve and the second locating shaft sleeve are disposed on the base, both the first locating shaft sleeve and the second locating shaft sleeve are arranged at an interval and are connected to the first connecting shaft, the second connecting shaft, the third connecting shaft, and the fourth connecting shaft, and the first end of the third swing arm, the first end of the fourth swing arm, the first meshing member, and the second meshing member are all arranged between the first locating shaft sleeve and the second locating shaft sleeve.

5. The folding mechanism according to claim 4, wherein the hinge mechanism further comprises a first elastic member and a second elastic member, the first elastic member is elastically located between the first end of the third swing arm and the first locating shaft sleeve, and the second elastic member is elastically located between the first end of the fourth swing arm and the first locating shaft sleeve.

6. The folding mechanism according to claim 5, wherein a first side surface of the first end of the third swing arm is provided with first meshing teeth, and a first side surface of the first end of the fourth swing arm is provided with second meshing teeth;

the hinge mechanism further comprises a first cam sleeve, the first cam sleeve is slidably disposed on the first connecting shaft, the first cam sleeve is provided with third meshing teeth and fourth meshing teeth, the third meshing teeth is opposite to the first meshing teeth, and the fourth meshing teeth is opposite to the second meshing teeth;

the first elastic member and the second elastic member are elastically arranged between the first cam sleeve and the first locating shaft sleeve; and the first elastic member and the second elastic member are in a compressed state, the third meshing teeth are meshed with the first meshing teeth, and the fourth meshing teeth are meshed with the second meshing teeth.

7. The folding mechanism according to claim 6, wherein a second side surface of the first end of the third swing arm is provided with fifth meshing teeth, and a second side of the first end of the fourth swing arm is provided with sixth meshing teeth, the hinge mechanism further comprises a second cam sleeve, the second cam sleeve is provided with seventh meshing teeth and eighth meshing teeth, the seventh meshing teeth are arranged opposite to the fifth meshing teeth, the eighth meshing teeth are arranged opposite to the sixth meshing teeth, a first part of the second cam sleeve is located between the second locating shaft sleeve and the first end of the third swing arm, and a second part of the second cam sleeve is located between the second locating shaft sleeve and the first end of the fourth swing arm.

8. The folding mechanism according to claim 5, wherein the first elastic member is sleeved on the first connecting shaft, and the second elastic member is sleeved on the second connecting shaft.

9. The folding mechanism according to claim 5, wherein the hinge mechanism further comprises a third elastic member and a fourth elastic member, the third elastic member is sleeved on the third connecting shaft, the fourth elastic member is sleeved on the fourth connecting shaft, and the first elastic member, the second elastic member, the third elastic member, and the fourth elastic member are elastically located between the first locating shaft sleeve and the gear mechanism.

10. The folding mechanism according to claim 1, wherein the first housing seat is provided with a first sliding groove, and the second end of the third swing arm is in sliding fit with the first sliding groove.

11. The folding mechanism according to claim 10, wherein an inner wall of the first sliding groove is provided with a first avoidance hole, a first rail body is secured to the first screen supporting plate, the second end of the third swing arm is provided with a first slider, the first rail body passes through the first avoidance hole to at least partially extend into the first sliding groove, and the first slider is slidably and rotatably fitted with the first rail body.

12. The folding mechanism according to claim 10, wherein the second housing seat is provided with a second sliding groove, and the second end of the fourth swing arm is in sliding fit with the second sliding groove.

13. The folding mechanism according to claim 12, wherein an inner wall of the second sliding groove is provided with a second avoidance hole, a second rail body is secured to the second screen supporting plate, the second end of the fourth swing arm is provided with a second slider, the second rail body passes through the second avoidance hole to at least partially extend into the second sliding groove, and the second slider is slidably and rotatably fitted with the second rail body.

14. The folding mechanism according to claim 1, wherein the base is provided with a third rail body and a fourth rail body, the first end of the first swing arm is provided with a third sliding groove, and the first end of the second swing arm is provided with a fourth sliding groove, or the base is provided with a third sliding groove and a fourth sliding groove, the first end of the first swing arm is provided with a third rail body, and the first end of the second swing arm is provided with a fourth rail body, wherein:
the third rail body is slidably and rotatably fitted with the third sliding groove, and the fourth rail body is slidably and rotatably fitted with the fourth sliding groove.

15. The folding mechanism according to claim 1, wherein the first screen supporting plate is provided with a first retaining wall and a second retaining wall, the first retaining wall and the second retaining wall are arranged opposite to each other, and the first housing seat is arranged between the first retaining wall and the second retaining wall, wherein:
the first retaining wall is provided with a fifth rail body, the second retaining wall is provided with a sixth rail body, the first housing seat is provided with a fifth sliding groove and a sixth sliding groove, the fifth rail body is in sliding fit with the fifth sliding groove, and the sixth rail body is in sliding fit with the sixth sliding groove; or,
the first retaining wall is provided with a fifth sliding groove, the second retaining wall is provided with a sixth sliding groove, the first housing seat is provided with a fifth rail body and a sixth rail body, the fifth rail body is in sliding fit with the fifth sliding groove, and the sixth rail body is in sliding fit with the sixth sliding groove.

16. The folding mechanism according to claim 1, wherein the second screen supporting plate is provided with a third retaining wall and a fourth retaining wall, the third retaining wall and the fourth retaining wall are arranged opposite to each other, and the second housing seat is arranged between the third retaining wall and the fourth retaining wall, wherein:
the third retaining wall is provided with a seventh rail body, the fourth retaining wall is provided with an eighth rail body, the second housing seat is provided with a seventh sliding groove and an eighth sliding groove, the seventh rail body is in sliding fit with the seventh sliding groove, and the eighth rail body is in sliding fit with the eighth sliding groove; or,
the third retaining wall is provided with a seventh sliding groove, the fourth retaining wall is provided with an eighth sliding groove, the second housing seat is provided with a seventh rail body and an eighth rail body, the seventh rail body is in sliding fit with the seventh sliding groove, and the eighth rail body is in sliding fit with the eighth sliding groove.

17. The folding mechanism according to claim 1, wherein there are at least two hinge mechanisms, and the at least two hinge mechanisms are arranged at an interval.

18. The folding mechanism according to claim 1, wherein the folding mechanism has a folded state and an unfolded state, wherein:
in the folded state, a distance between the first end of the first screen supporting plate and the first end of the second screen supporting plate is a first distance, a distance between the second end of the first screen supporting plate and the second end of the second screen supporting plate is a second distance, and the first distance is greater than the second distance, wherein the first end of the first screen supporting plate is an end of the first screen supporting plate adjacent to the base, the second end of the first screen supporting plate is another end of the second screen supporting plate away from the base, the first end of the second screen supporting plate is an end of the second screen supporting plate adjacent to the base, and the second end of the second screen supporting plate is another end of the second screen supporting plate away from the base; and
in the unfolded state, a support surface of the first screen supporting plate is coplanar with a support surface of the second screen supporting plate.

19. An electronic device, comprising the folding mechanism according to claim 1, a flexible screen, a first housing, and a second housing, wherein the first housing is fixedly connected to the first housing seat, the second housing is fixedly connected to the second housing seat, the first screen supporting plate is arranged between the first housing and the base, the second screen supporting plate is arranged between the second housing and the base, and the flexible screen is disposed on the base, the first housing, the second housing, the first screen supporting plate, and the second screen supporting plate.

20. The electronic device according to claim 19, wherein the first housing is provided with a first groove, the second housing is provided with a second groove, the first screen supporting plate is disposed in the first groove, and the second screen supporting plate is disposed in the second groove.

* * * * *